No. 860,088. PATENTED JULY 16, 1907.
F. R. HART.
CLINICAL THERMOMETER CASE.
APPLICATION FILED NOV. 7, 1906.
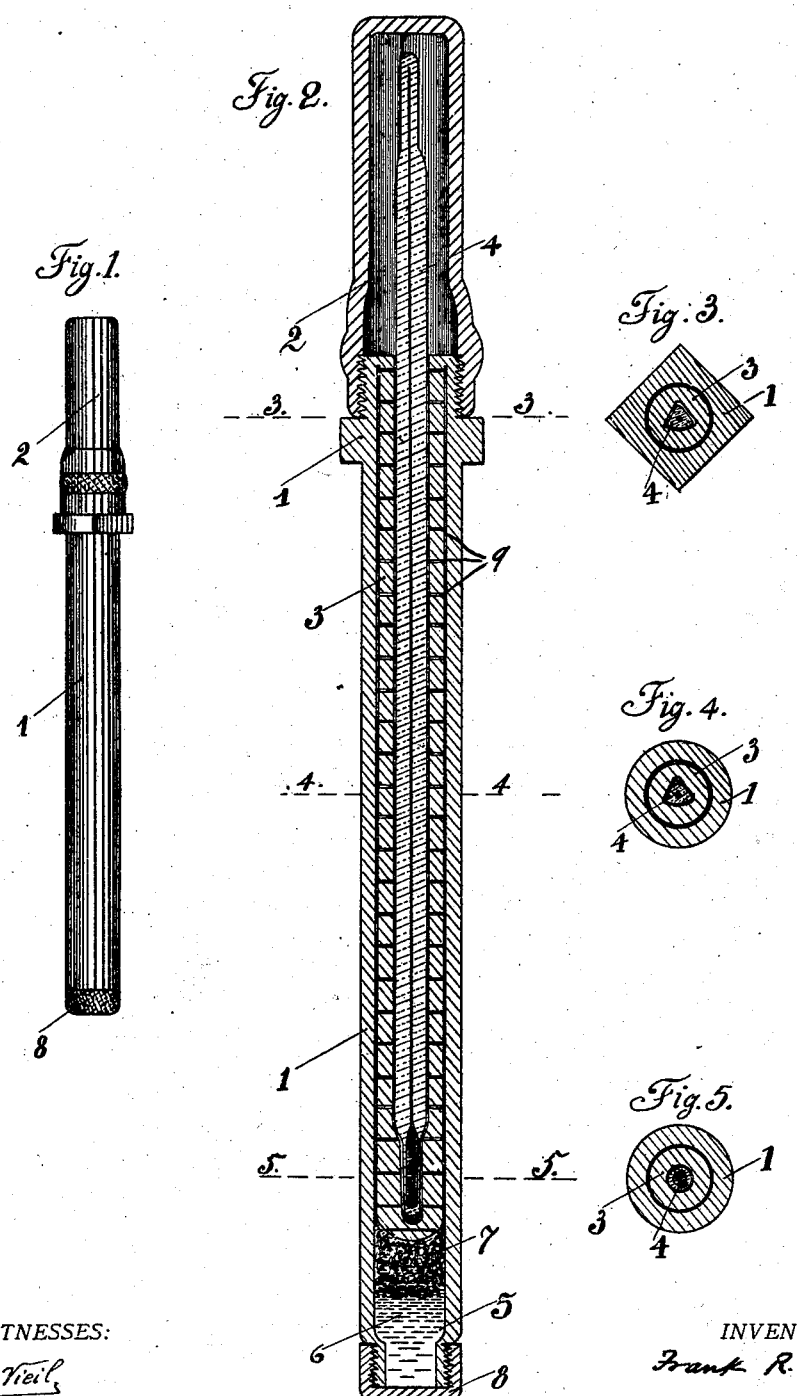
WITNESSES:
INVENTOR,
ATTORNEY.

UNITED STATES PATENT OFFICE.

FRANK R. HART, OF SUISUN CITY, CALIFORNIA.

CLINICAL-THERMOMETER CASE.

No. 860,088.

Specification of Letters Patent.

Patented July 16, 1907.

Application filed November 7, 1906. Serial No. 342,326.

*To all whom it may concern:*

Be it known that I, FRANK R. HART, a citizen of the United States, residing at Suisun City, in the county of Solano and State of California, have invented new and useful Improvements in Clinical-Thermometer Cases, of which the following is a specification.

The object of the present invention is to provide a clinical thermometer case so constructed as to prevent the spreading of disease by the conveyance of germs from one patient to another, and more effectually than is accomplished at present by the mere washing and wiping of the thermometer after use.

In the accompanying drawing, Figure 1 is a side view of the thermometer case; Fig. 2 is a longitudinal section thereof on an enlarged scale; Figs. 3, 4, and 5, are cross sections on the lines, 3—3, 4—4, and 5—5, of Fig. 2.

Referring to the drawing, 1 indicates the outer tube of the case, having a top 2 screwed thereto. Within said tube 1 is an inner tube 3, closed at its bottom, and joined to the tube 1 at its top by cement or in any suitable manner so as to form substantially one piece therewith.

4 indicates the clinical thermometer, which can be of the usual or any approved form. The inner tube 3 is formed with apertures or passages 9.

The tube 1 extends below the bottom of the inner tube 3 to form a receptacle 5 for an antiseptic liquid, shown at 6, and absorbent material 7, such as cotton, is also inserted in said receptacle. The bottom of the outer tube is closed by a screw cap 8.

The whole of the thermometer case is preferably made of hard rubber, metal or other hard, tenacious and coherent material, which will retain its form for an indefinite period of use, and will not, by attrition with the thermometer, undergo any appreciable diminution.

The relative dimensions of the outer and inner tubes and of the thermometer inclosed therebetween, and the dimensions of the apertures of the inner tube, constitute the essence of this invention. The external diameter of the inner tube and the internal diameter of the outer tube are of such relative magnitude as to form an annular capillary channel between the two tubes, so that the liquid ascends in said channel by capillarity from the receptacle in the bottom of the outer tube. In like manner the apertures through the inner tube are of capillary dimensions. So also the inner surface of the inner tube is conformed to fit around the thermometer sufficiently close to cause the liquid to fill the space between them by capillary attraction. The result is, that when the thermometer is re-inserted into the case, all that part thereof which is generally placed in the mouth of the patient is thoroughly moistened by the antiseptic liquid, which flows, first between the two tubes, and then through the holes in the inner tube, and thus the thermometer is sterilized before it is again used. The absorbent material prevents the liquid overflowing and running through the apertures, even should the case be laid in a horizontal position or inverted. The receptacle can be readily replenished by unscrewing the cap 8 and refilling.

It is to be understood that the invention is not limited to any precise form of case, but the case is to be constructed to conform with the thermometer with which it is used. The only limitations are, that the material of which the inner tube is formed should be hard, tenacious and coherent, like hard rubber or metal, as distinguished from felt or fibrous material so that particles thereof be not worn off by attrition with the thermometer in removing it from, and inserting it into, the case, and that the relative dimensions should be such as to cause the liquid to ascend by capillarity and thus come into effective contact with the surface of the thermometer.

I claim:—

A thermometer case having an inner portion formed of hard, tenacious and coherent material and having an inner surface conformed to fit closely against the thermometer when in position, and having formed therethrough capillary passages for conducting a liquid to said thermometer, said case being provided with capillary means for conducting the liquid to said passages, substantially as described.

In testimony whereof I have hereunto set my hand in the presence of two subscribing witnesses.

FRANK R. HART.

Witnesses:
 FRANCIS M. WRIGHT,
 HATTIE LEVY.